United States Patent [19]

Zimmerman et al.

[11] Patent Number: 5,290,860
[45] Date of Patent: Mar. 1, 1994

[54] POLYMER ALLOYS OF RUBBER MODIFIED ACRYLIC MULTIPOLYMERS, AND POLYCARBONATES; AND METHODS OF MAKING THE SAME

[75] Inventors: Daniel D. Zimmerman, Stratford; Gary Vieiro, Milford; Dennis S. Pavlick, Meriden, all of Conn.

[73] Assignee: Cyro Industries, Mt. Arlington, N.J.

[21] Appl. No.: 975,160

[22] Filed: Nov. 12, 1992

Related U.S. Application Data

[63] Continuation of Ser. No. 627,673, Dec. 14, 1990, abandoned.

[51] Int. Cl.$^5$ .................. C08L 69/00; C08L 33/12; C08L 51/04
[52] U.S. Cl. ..................... 525/67; 525/133; 525/148
[58] Field of Search ............... 525/67, 133, 148

[56] References Cited

U.S. PATENT DOCUMENTS

| | | | |
|---|---|---|---|
| 3,162,695 | 12/1964 | Grabowski | 525/316 |
| 3,261,887 | 7/1966 | Mann et al. | 260/876 |
| 3,354,238 | 10/1967 | Schmitt et al. | 260/876 |
| 3,852,393 | 12/1974 | Furukawa et al. | 260/873 |
| 3,852,394 | 12/1974 | Kubota | 525/67 |
| 3,864,428 | 2/1975 | Nakamura | 525/67 |
| 3,873,641 | 3/1975 | Margotte et al. | 260/873 |
| 3,978,159 | 8/1976 | Neuray | 525/67 |
| 4,085,166 | 4/1978 | DiLeone et al. | 260/876 R |
| 4,228,256 | 10/1980 | Schmitt et al. | 525/302 |
| 4,242,469 | 12/1980 | Schmitt et al. | 525/71 |
| 4,393,169 | 7/1983 | Moriwaki | 525/67 |
| 4,444,949 | 4/1984 | Liu | 525/67 |
| 4,461,868 | 7/1984 | Lindner et al. | 525/67 |
| 4,490,506 | 12/1984 | Sakano et al. | 525/67 |
| 4,511,693 | 4/1985 | Fox et al. | 525/67 |
| 4,579,909 | 4/1986 | Giles et al. | 525/148 |
| 4,595,729 | 6/1986 | Fox et al. | 525/147 |
| 4,603,169 | 7/1986 | Mitulla et al. | 525/67 |
| 4,624,986 | 11/1986 | Weber et al. | 525/67 |
| 4,683,265 | 7/1987 | Kress et al. | 525/67 |
| 4,806,593 | 2/1989 | Kress et al. | 525/63 |
| 4,866,125 | 9/1989 | Lo et al. | 525/67 |
| 4,883,836 | 11/1989 | Thill | 525/66 |
| 4,885,335 | 12/1989 | Gallucci et aql. | 525/67 |

FOREIGN PATENT DOCUMENTS

| | | |
|---|---|---|
| 016743 | 2/1974 | Japan . |
| 132145 | 12/1974 | Japan | 525/67 |
| 132147 | 12/1974 | Japan | 525/67 |

Primary Examiner—David Buttner
Attorney, Agent, or Firm—Bart E. Lerman; Frank M. Van Riet; Michael J. Kelly

[57] ABSTRACT

Commercially available solid rubber modified acrylic multipolymers and polycarbonate polymer are tumble blended and melted and extruded through an extruder. Resulting alloys comprise an unsaturated rubber such as polybutadiene grafted with methylmethacrylate and styrene; a multipolymer comprising methylmethacrylate and styrene, and acrylonitrile, ethylacrylate, or methylacrylate; and polycarbonate. The ratio of rubber to graft monomers ranges from about 1:1 to about 6:1 and is preferably about 3:1. Graft monomers comprise from about 60 to about 85 parts methylmethacrylate, about 15 to about 30 parts styrene, and up to about 15 parts methylacrylate, ethylacrylate, or acrylonitrile. The multipolymer comprises from about 60 to about 80 parts of methylmethacrylate, about 15 to about 30 parts of styrene, and up to 15 parts of methylacrylate, ethylacrylate, or acrylonitrile. The ratio of graft rubber to multipolymer ranges from about 5:95 to about 25:75. The ratio of graft rubber and multipolymer to polycarbonate ranges from about 20:80 to about 80:20. The rubber in the acrylic multipolymers preferably comprises about 14 percent by weight thereof.

11 Claims, 2 Drawing Sheets

POLYMER ALLOYS OF RUBBER MODIFIED ACRYLIC MULTIPOLYMERS, AND POLYCARBONATES; AND METHODS OF MAKING THE SAME

This application is a continuation of application Ser. No. 07/627,673 filed Dec. 14, 1990 now abandoned.

TECHNICAL FIELD

This invention relates to polymer alloys of unsaturated rubber grafted with methylmethacrylate and styrene; additional multipolymer comprising methylmethacrylate and styrene; and polycarbonate. The multipolymer preferably also comprises acrylonitrile, ethylacrylate or methylacrylate. Polymer alloys according to the invention are formed by mixing solid particles of commercially available rubber modified acrylic multipolymers and polycarbonate. Such rubber modified acrylic multipolymers are sold under the trademarks XT ® and Cyrolite ® by Cyro Industries, Mount Arlington, N.J.

BACKGROUND ART

Polycarbonates which are used in engineering applications are tough, relatively brittle in thick parts, difficult to process, and expensive. It is desirable that polycarbonates be modified without reducing their toughness by blending them with less expensive polymers, and that their processability and brittleness be improved.

Thus the prior art has modified polycarbonates with polybutadiene rubber grafted to styrene and acrylonitrile or polybutadiene grafted to styrene and methylmethacrylate (MMA) with various combinations of styrene and acrylonitrile copolymers, and ABS. Examples of such alloys may be found in U.S. Pat. Nos. 3,852,394, 3,873,641, 4,461,868, 4,683,265, and 4,806,593 which patents are incorporated herein by reference.

The prior art gives little or no guidance as to the efficacy or practicality of untried alloys or how to select them from the myriad of possibilities available.

DISCLOSURE OF THE INVENTION

We have discovered that alloys based on commercial modified acrylic multipolymers, such as Cyro's XT ® and Cyrolite ® multipolymers when blended with polycarbonates produce materials having very high impact strengths with notched Izod values superior to polycarbonate in inch thick sections. These alloys also offer a good balance of mechanical strength, heat resistance, and processability which make them commercially attractive. Use of the high flow versions of the above-identified modified acrylic multipolymers, has resulted in even higher notched Izods in ⅛ inch thick sections which results are also superior to those of pure polycarbonates. These latter materials have outstanding processability and maintain a good balance of mechanical strength and heat resistance.

Alloys of said commercial rubber modified acrylic multipolymers and polycarbonates, according to the invention, can range from a ratio by weight from about 20:80 to about 80:20. The graft rubber to polymer ratio in the rubber modified acrylic multipolymers used in the invention ranges by weight from about 5:95 to about 25:75. The rubber, preferably, comprises about 14 percent of the multipolymer alloy. The multipolymer component of the alloy comprises from about 60 to about 80 parts by weight of methylmethacrylate, about 15 to about 30 parts by weight of styrene, and up to about 15 parts by weight of methylacrylate, ethylacrylate, or acrylonitrile. The graft monomers in the rubber modified acrylics of the invention comprise by weight from about 60 to about 85 parts of methylmethacrylate, about 15 to about 30 parts styrene, and up to about 15 parts of methylacrylate, ethylacrylate, or acrylonitrile. The weight ratio of rubber to graft monomers in said graft rubber ranges from about 1:2 to about 6:1.

The rubber modified acrylic multipolymers used comprise an unsaturated rubber, polybutadiene being preferred. In practice, commercial rubber modified acrylic multipolymers having a weight ratio of rubber to graft monomers of about 3:1 may be utilized in the invention.

The rubber modified acrylic alloys sold under the trademarks XT ® and Cyrolite ® by Cyro Industries utilized in this invention are manufactured in accordance with one or more of the following U.S. Pat. Nos.: 3,261,887, 3,354,238, 4,085,166, 4,228,256, and 4,242,469 which patents are incorporated herein by reference. The compositions of the rubber modified acrylic multipolymers are particularly set forth in the above noted U.S. Pat. No. 4,228,256 wherein the ratios of the components of the rubber modified acrylic multipolymers given above may be found.

The multipolymer component of the commercially available alloys XT ® alloys is a terpolymer of about 60% to about 70% of MMA, about 20% styrene, and about 10% to about 20% acrylonitile. The multipolymer component of the commercially available Cyrolite ® alloys is a terpolymer of about 5% ethylacrylate, about 15% to about 25% styrene, and 70% to about 80% MMA. These alloys all contain about 14% rubber and their rubber graft and multipolymer components are substantially free of α-methylstyrene, (meth)acrylonitrile, maleic anhydride, and n-substituted maleimide.

The above ratios and percentages are all by weight.

Various polycarbonates may be used in the invention, such as Lexan ® 181 polycarbonate available from General Electric Company, Calibre ® 302-60 polycarbonate available from The Dow Chemical Company, and Makrolon ® 3103 available from Mobay Chemical Company. These materials may be made in accordance with U.S. Pat. Nos. 4,885,335 and 4,883,836 which are incorporated herein by reference or in accordance to the prior art cited in those patents.

OBJECTS OF THE INVENTION

It is therefore among the objects of the invention to provide polymer alloys comprising polycarbonate having high impact strength and notched Izods equal or superior to pure polycarbonate.

Another object of the invention is to provide such alloys exhibiting a good balance of mechanical strength, heat resistance, and processability, making them commercially attractive.

A further object of the invention is to provide such alloys having superior toughness and outstanding processability at a lower cost than pure polycarbonate.

A still further object of the invention is to provide such alloys utilizing commercial rubber modified acrylic multipolymers and polycarbonate polymers.

Other objects of the invention will in part be obvious and will in part appear hereinafter.

The invention accordingly comprises products, compositions of matter, and methods—all possessing features, properties, ingredients, and characteristics, and the several steps and the relation of one or more said steps with respect to each of the others, which will be exemplified in the products, compositions, and methods hereinafter disclosed. The scope of the invention will be indicated in the claims.

BRIEF DESCRIPTION OF THE DRAWINGS

For a fuller understanding of the nature and objects of the invention, reference should be had to the following detailed description, taken in connection with the accompanying drawings, in which.

The same reference characters refer to the same elements throughout the several views of the drawings.

BEST MODE FOR CARRYING OUT THE INVENTION

Preparation of Alloys

Figure 1:
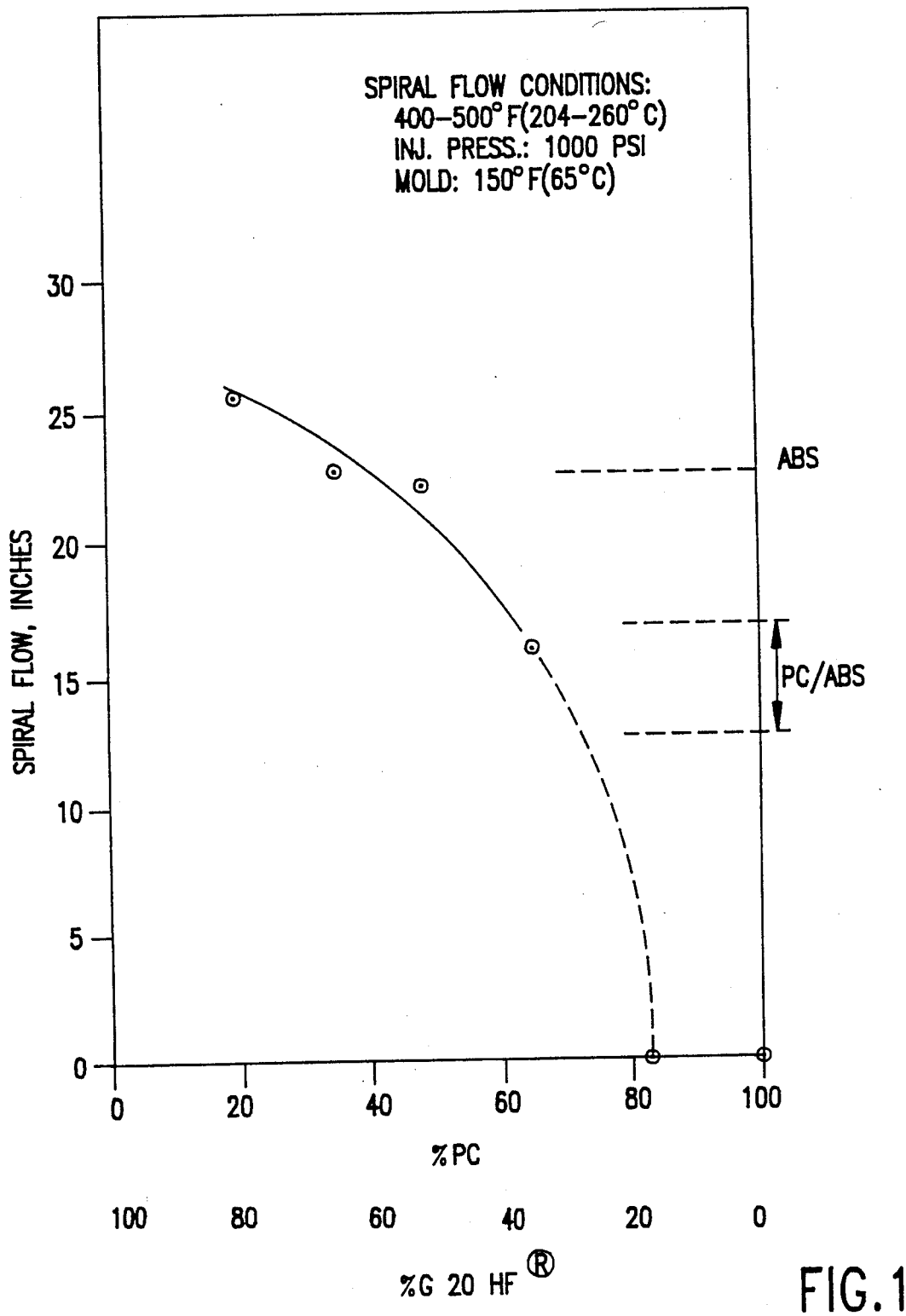
FIG. 1 is a graph of melt flow versus the ratio of rubber modified acrylic multipolymer to polycarbonate in alloys according to the invention; and, FIG. 2 is a graph of spiral flow versus said ratio in alloys according to the invention.

Various alloys of different compositions obtained by tumble alloying solid particles of Cyro's XT®, or Cyro's Cyrolite® multipolymers and various polycarbonates and extruding them through a 30 mm Leistritz® twin screw extruder. Temperatures in the extruder were set at 450° F. across the board and screw rpm held at 100. Under these conditions, the average residence time in the extruder is less than 2.5 minutes. Actual measured melt temperatures ranged from 470°–510° F. The strands from the Leistritz® were water cooled, pelletized, and oven dried prior to injection molding.

Alloys were also prepared on a 1¾" single screw Prodex® extruder. Barrel heat settings were set at 450° and rpm held at 100. Extrusion rates were approximately 150 lbs/hr. Melt temperatures were 500°–530° F.

Alloys were also prepared on a 90 mm Breyer® single screw extruder. Barrel heat settings were at 400° F. to 470° F. Die. Melt temperatures were approximately 530° F.

All materials were injection molded on a 75 ton New Britain® injection molding machine. Mold temperatures were set at 140°–160° F. Barrel heat settings were 460° to 490° F. Melt temperatures ranged from 510°–530° F. Injection pressure was 1000–1200 psi, back pressure 50–150 psi, and moderate injection speeds were used.

Tests Performed

| Description | Procedure |
| --- | --- |
| Notched Izod Impact | ASTM D-256 |
| Dart Drop (a measure of resistance to cracking due to a falling weight) | Modified Gardner ASTM D-3029-84 Method G, 4 lb. weight used, Dart Dimensions: 2⅛" × 0.625" Diameter |
| Tensile Tests | ASTM D-638 |
| DTL (Deflection Temperature Level) | ASTM D-648 |
| Vicat (softening temperature) | ASTM D-1525 |
| M.F.I. (Melt Flow Index) | ASTM D-1238 |
| Rockwell Hardness | ASTM D-785 |
| Yellow Index | ASTM D-1000-3 |
| Gloss | Gloss using Glossgard ® meter as per ASTM D-3523 |

The notched Izod and Melt Flow Index values of the rubber modified acrylic alloys used are as follows:

| GRADE | NOTCHED IZOD (fppi) ¼ inch bar | M.F.I. (@ 230° C./5000 g) |
| --- | --- | --- |
| XT ® 375 | 1.7 | 2 |
| XT ® X800RG | 1.7 | 14 |
| XT ® 312 | 1.8 | 2.6 |
| Cyrolite ® G20 HiFlo ® | 1.7 | 12 |

EXAMPLES 1–5

These materials were compounded on the 30 mm Leistritz ® twin screw as described above and molded also as previously described. Results are presented in Table I.

Examples 1–3 give properties of XT ® 375 with PC at levels of 50:50, 75:25, and 25:75 respectively. XT ® 375 is a rubber modified acrylic multipolymer. Comparative properties of XT ® 375 and Lexan ® 181 polycarbonate (G.E.) are shown in Examples 4 and 5.

Excellent impact properties (notched Izod) were obtained particularly at 50:50 XT ® 375/PC levels and higher. Also to be noted are the relatively high notched Izod values in thicker sections. These values are substantially above those which can be obtained with 100% PC, which is known to have notched Izods of 2–3 ft-lb/in. in ¼" thick sections. Other properties such as tensile strength, modulus, and elongation are intermediate in value between the PC and the XT ® 375.

TABLE I

KEY PROPERTIES OF XT ® 375/PC BLENDS
(PC used: Lexan ® 181)

| | EXAMPLE | | | | |
| --- | --- | --- | --- | --- | --- |
| | 1 | 2 | 3 | 4 | 5 |
| | MATERIAL | | | | |
| | XT ® 375/PC | | | XT ® | PC LEXAN ® |
| DESCRIPTION | 50:50 | 75:25 | 25:75 | 375 | 181 |
| % Rubber | 7.0 | 10.5 | 3.5 | 14 | — |
| Tensile Strength, psi | 9300 | 9000 | 9600 | 8100 | 9700 |
| Elongation, % Yield/Break | 4.4/28.6 | 3.8/33.5 | 4.7/27.8 | 3.2/15.1 | 5.6/114.7 |
| Tensile Modulus, psi $10^6$ | 0.37 | 0.39 | 0.37 | 0.38 | 0.35 |
| Flexural Strength, psi | 13,500 | 12,700 | 14,000 | — | — |
| Flexural Modulus, | 0.37 | 0.36 | 0.36 | — | — |

TABLE I-continued

KEY PROPERTIES OF XT ® 375/PC BLENDS
(PC used: Lexan ® 181)

| | EXAMPLE | | | | |
|---|---|---|---|---|---|
| | 1 | 2 | 3 | 4 | 5 |
| | | | MATERIAL | | |
| | XT ® 375/PC | | | XT ® | PC LEXAN ® |
| DESCRIPTION | 50:50 | 75:25 | 25:75 | 375 | 181 |
| psi $10^6$ | | | | | |
| Notched Izod, fppi | | | | | |
| 1/8" | | | | | |
| (Rm Temp) Avg. | 8.9 | 4.0 | 11.5 | 2.4 | 17.1 |
| Range | (7.5–10.6) | (3.5–4.1) | (10.6–13.0) | (2.2–2.5) | (16.3–18.0) |
| 1/4" | | | | | |
| (Rm Temp) Avg. | 6.9 | 2.7 | 9.4 | — | — |
| Range | (6.6–7.2) | (2.4–3.0) | (8.6–10.4) | | |
| Rockwell Hardness, M | 57 | 56 | 57 | — | — |
| DTL, °C. @ 264 psi | 102 | 93 | 123 | — | — |
| Vicat, °C. | 146 | 119 | 147 | — | — |

EXAMPLES 6–9

These materials were similarly processed as in examples 1–5. Additional grafted rubber, i.e., polybutadiene rubber grafted with MMA and styrene monomer, was added in two of the alloys. A physical property evaluation was conducted and the results are shown in Table II.

The excellent results previously found were corroborated and extended. The excellent processability of these materials is shown by their relatively high melt flow at conditions under which polycarbonate does not flow at all (i.e., 230° C./3.8 kg). At polycarbonate levels of 50% and less, the alloys flow very similarly to the rubber modified acrylic multipolymers. Even at a 60% PC level, there is significant flow.

TABLE II

KEY PROPERTIES OF XT ® 375/PC BLENDS
MATERIAL DESCRIPTION
XT ® 375/PC

| EXAMPLE | 6 | 7 | 8 | 9 |
|---|---|---|---|---|
| XT ® 375 | 71.4 | 55.0 | 40.0 | 50.0 |
| and Additional Grafted Rubber % | — | YES | YES | — |
| PC % | 28.6 | 45.0 | 60.0 | 50.0 |
| Rubber % | 10 | 10 | 10 | 7 |
| Tensile Strength, psi | 9400 | 9100 | 8400 | 9500 |
| Elongation, % Yield/Break | 4.1/17.3 | 4.5/28.6 | 4.6/22.1 | 4.5/31.6 |
| Tensile Modulus, psi $10^6$ | .38 | .36 | .32 | .38 |
| Flexural Strength, psi | 13,200 | 12,500 | 11,800 | 13,700 |
| Flexural Modulus psi $10^6$ | .37 | .35 | .32 | .37 |
| Charpy, fppi | No Break (N.B.) | N.B. | N.B. | N.B. |
| Notched Izod, fppi | | | | |
| 1/8" (Rm Temp) Avg. | 4.1 | 5.7 | 12.5 | 7.0 |
| Range | (3.6–4.7) | (4.1–7.5) | (8.4–25.9) | (6.3–7.9) |
| 1/4" (Rm Temp) Avg. | 2.4 | 8.4 | 15.0 | 11.8 |
| Range | (1.5–3.8) | (3.0–14.2) | (11.3–20.7) | (6.7–20.1) |
| 1/8" (−20° C.) Avg. | 1.2 | 2.1 | 7.3 | 2.3 |
| Range | (0.9–1.7) | (1.4–4.4) | (4.7–13.4) | (1.9–2.9) |
| 1/4" (−20° C.) Avg. | 0.9 | 2.7 | 8.7 | 1.2 |
| Range | (0.5–1.5) | (0.5–5.3) | (6.3–11.9) | (1.6–6.3) |
| DTL, °C. @ 264 psi | 100 | 97 | 122 | 104 |
| Vicat, °C. | 122 | 143 | 152 | 141 |
| Gloss | 73 | 78 | 50 | 82 |
| M.F.I. (230° C./3.8 kg) | 2.2 | 1.6 | 1.3 | 1.9 |

PC used: Dow Calibre ® 302-60 or Mobay Makrolon ® 3103

EXAMPLES 10–16

These examples are based on three different compositions of a rubber modified acrylic multipolymer alloy compounded in three different extruders. All compositions are at a 50:50 rubber modified acrylic multipolymer polycarbonate level. Example 10 was obtained us XT ® 312, multipolymer alloy essentially identical to XT ® 375 alloy previously utilized but with a slightly higher melt flow (i.e., 1.7 vs. 1.3 at 230° C./3.8 kg). The alloy was compounded on a 1¾" Prodex ® screw extruder.

Examples 11 through 13 consist of alloys of XT ® X800 RG ® alloy with PC. This multipolymer alloy is a very high flowing material of lower molecular weight than those previously used. Its melt flow (at 230° C./3.8 kg) is approximately 7.9. These alloys were prepared in three different extruders, namely a 30 mm twin screw, a 1¾" single screw Prodex ®, and a 90 mm Breyer ® single screw.

Examples 14 through 16 consist of alloys of Cyrolite ® G20 HF ® with PC. This multipolymer alloy is somewhat different from the XT ® materials in terms of chemical composition, but also has very good flow properties (i.e., melt flow of 9.2. at 230° C./3.8 kg). As in examples 11 through 13, these materials were prepared in three different extruders. The results are shown in Table III.

It can be seen that the higher flow acrylic multipolymers result in dramatically improved notched Izod impact properties in thin parts (⅛" thickness) compared to the higher molecular weight acrylic multipolymer alloys in the prior Examples. (Examples 11–16 vs. Example 10). They also result in much higher melt flow properties which are indicative of better processability. Other properties which appear to be improved include notched Izod in thicker parts (¼") and elongation at break. (Examples 12 and 15 vs. Example 10).

Comparing properties obtained in the three different extruders, the materials look essentially similar within the scatter of the data. Overall, the high flowing acrylic multipolymer alloys at a 50:50 level with polycarbonate show much better impact (notched Izod) properties than pure PC both in the ⅛" and ¼" thick sections and dramatically improved processability.

molded on a 75 ton New Britain ® injection molding machine.

The results are presented in Table IV. It can be seen that extremely high impact (notched Izod) is achieved at room temperature at a 50:50 PC:G-20 HF with only smaller incremental increases at 65% PC. At a PC level of 80%, notched Izods decrease very significantly. Note also that even at relatively low PC levels of 35%, notched Izods equivalent to high impact ABS and close to PC/ABS are obtained. Mechanical properties such as tensile strength, tensile modulus, flexural strength, and flexural modulus are essentially equivalent to PC/ABS over the entire range evaluated and much better than high impact ABS.

Cold temperature impact at −40° C. is seen to be substantially below that of PC/ABS particularly in thicker sections and in alloys with lower PC levels. Compared to high impact ABS, it is equivalent to better depending on PC levels.

The heat deflection temperature is below that of PC/ABS in composition with 50% or less PC. This presumably reflects the fact that the acrylic terpolymer is the dominant phase. At 65% PC, the DTL approaches that of PC/ABS. It is equivalent to that of the high impact ABS at lower PC levels and surpasses it at higher levels.

TABLE III

Properties of Various Acrylic Terpolymer/PC Alloys

| | EXAMPLE | | | | | | |
|---|---|---|---|---|---|---|---|
| | 10 | 11 | 12 | 13 | 14 | 15 | 16 |
| | | | Material Composition | | | | |
| | 1:1:XT ® 312/PC 302 | 1:1 XT ® X800 RG/PC 302 | | | 1:1 G20 HF/PC 302 | | |
| Compounded | 1¾" S.S. Prodex ® (P) | 30 mm Leistritz ® (L) | (P) | 90 mm S.S. Breyer ® (B) | (L) | (P) | 90 mm S.S. (B) |
| Tensile Strength, psi | 8400 | 8600 | 8400 | 8400 | 8000 | 8500 | 8400 |
| Elongation, % yield/break | 4.1/12 | 4.2/21 | 4.2/31 | 15.0/27 | 4.6/62 | 4.4/84 | 15.0/53 |
| Tensile Modulus, psi $(10)^6$ | .37 | .36 | .31 | .34 | .35 | .34 | .34 |
| Flexural Strength, psi | 13,300 | 12,000 | 12,500 | 12,300 | 12,000 | 11,400 | 11,900 |
| Flexural Modulus, psi $(10)^6$ | — | .32 | .33 | .32 | .31 | .30 | .30 |
| Dart Drop, fppi | 48 | 32 | — | 41 | 53 | — | 39 |
| Charpy Impact, fppi | No break (N.B) | N.B | — | N.B | N.B | N.B | N.B |
| N. Izod, fppi | | | | | | | |
| @ Rm Temp | | | | | | | |
| ⅛" | 5.9 | 24.2 | 16.0 | 20.5 | 28.8 | 30.0 | 29.3 |
| ¼" | 8.1 | 8.6 | 9.5 | 10.7 | 8.7 | 11.0 | 13.5 |
| @ −40° C. | | | | | | | |
| ⅛" | — | 2.6 | — | 2.0 | 2.1 | 3.3 | 2.7 |
| ¼" | — | 2.1 | — | 1.5 | 1.0 | 1.6 | 1.2 |
| Hardness, Rockwell (M) | 55 | 39 | 48 | 42 | 54 | — | 42 |
| DTL, °C. @ 264 psi | 101 | 103 | 101 | 103 | 107 | 102 | 100 |
| Vicat, °C. | — | 146 | 145 | 145 | 145 | 140 | 143 |
| Gloss° (Angle) | 67(20) | 91(20) | — | 76(60) | 82(60) | 81(60) | 76(60) |
| M.F.I. (230° C./3.8 kg) | 1.8–2.8 | 5.9 | 5.8 | 4.7 | 3.5 | 5.0 | 3.7 |

PC 302 = Dow Calibre ® 302-60 and/or Mobay Makrolon ® 3103

EXAMPLES 17–24

Examples 17 through 21 were obtained by varying the level of PC to Cyrolite ® G-20 HF ® acrylic multipolymer alloy. They were alloyed in a 30 mm Leistritz ® twin screw at the conditions previously described. These materials and commercial alloys of PC/ABS (examples 22, 23) and ABS (example 24) were Processability can often be better described in terms of flowability in a spiral flow mold rather than as a melt flow index. This is because shear conditions prevalent in molding are operative rather than the ones used in a melt index apparatus. Results obtained in spiral flow testing show that the alloys of the invention are superior to PC/ABS when PC does not exceed 50% and equivalent to it at 65% PC. The lower PC-containing grade (example 19) is seen equivalent to the high impact ABS.

Figure 2:
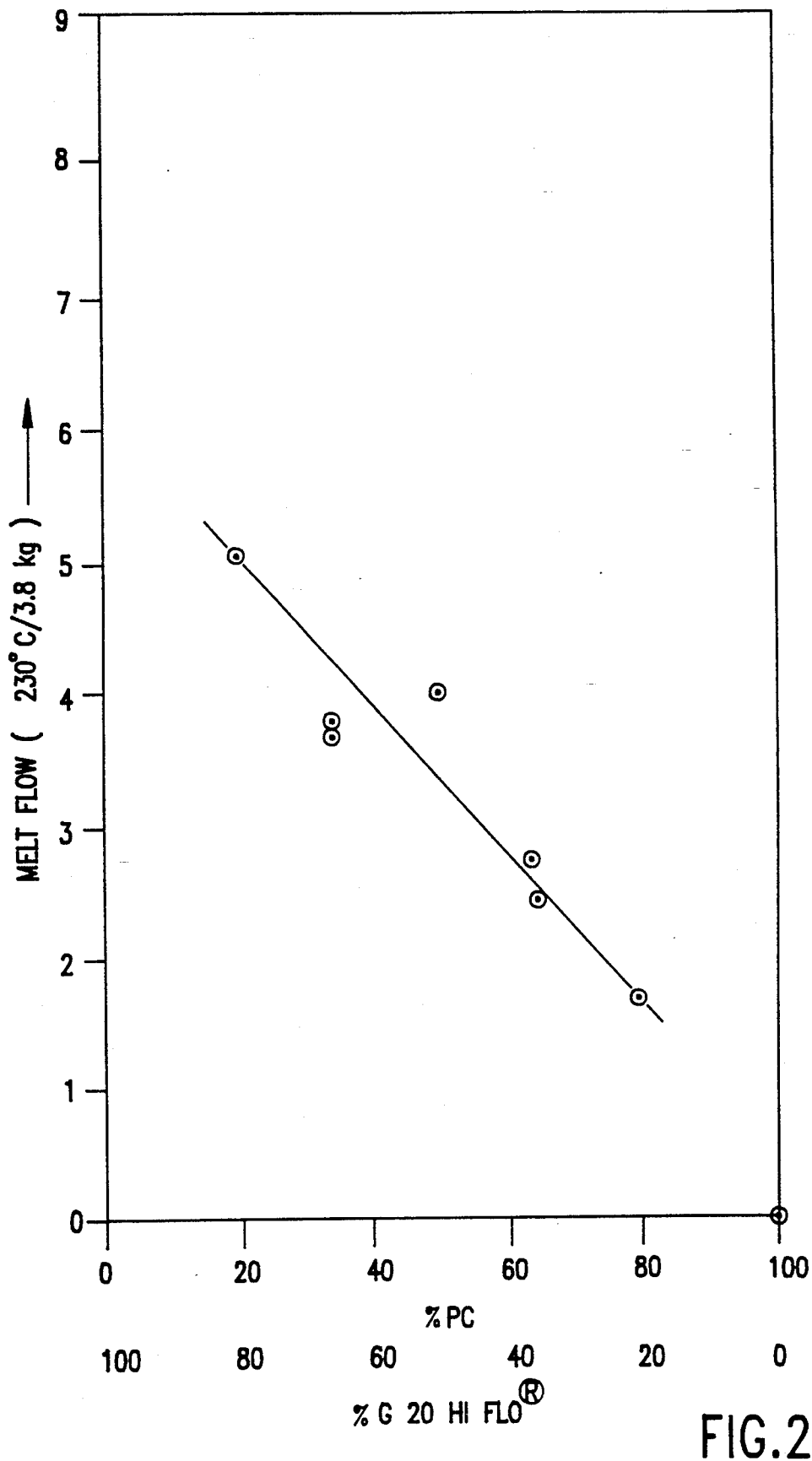

Melt Flow vs. PC level is shown in FIG. 1 and Spiral Flow vs. PC level is shown in FIG. 2. It can be seen that, even at 80% PC, there is still a substantial melt flow and a substantial spiral flow at 65%, whereas PC does not flow at all under these conditions.

the like, and such materials may be added to the compositions of the invention as desired.

In the above Examples and in the accompanying Tables and graphs, ratios and percentages are by weight. By multipolymer, we mean a polymer comprising two or more monomers.

It will thus be seen that the objects set forth above

TABLE IV

Key Properties of G20 HF/PC302 Blends Vs. PC/ABS and High Impact ABS

| | EXAMPLE | | | | | | | |
|---|---|---|---|---|---|---|---|---|
| | 17 | 18 | 19 | 20 | 21 | 22 | 23 | 24 |
| | | | | | MATERIAL | | | |
| | PC: G20 HIFLO ® | | | | | PC/ABS MOBAY BAYBLEND ® | | HIGH IMPACT ABS DOW MAGNUM ® |
| PROPERTY | 20:80 | 35:65 | 50:50 | 65:35 | 80:20 | T84 | T85 | 491 |
| Rubber % | 11.2 | 9.1 | 7.0 | 4.9 | 2.8 | — | — | — |
| Tensile Strength, psi (yield) | 6200 | 7500 | 8300 | 7500 | | 7800 | 8300 | 6300 |
| Elongation, % | | | | | | | | |
| yield | 3.6 | 4.0 | 4.4 | 4.7 | | 4.0 | 4.2 | 2.5 |
| break | 12.6 | 35.5 | 77.0 | 83.1 | | 75.8 | 91.9 | 14.4 |
| Tensile Modulus, psi $(10)^6$ | .30 | .32 | .34 | .38 | .35 | .32 | .34 | .34 |
| Flexural Strength, psi | 10,300 | 11,500 | 12,400 | 14,000 | 14,200 | 12,100 | 12,800 | 8900 |
| Flexural Modulus, psi $(10)^6$ | .28 | .30 | .31 | .33 | .32 | .30 | .32 | .29 |
| Notched Izod, fppi | | | | | | | | |
| @ Room Temp. | | | | | | | | |
| ½" | 1.9 | 12.4 | 26.3 | 29.9 | 15.7 | 12.3 | 12.4 | 9.5 |
| ¼" | 1.8 | 8.1 | 13.6 | 15.9 | 12.3 | 10.0 | 11.5 | 7.5 |
| @ −40° C. | | | | | | | | |
| ½" | 1.0 | 2.3 | 3.8 | 5.3 | 7.7 | 7.7 | 6.6 | 2.5 |
| ¼" | 1.0 | 1.8 | 2.2 | 2.3 | 4.8 | 5.4 | 5.5 | 2.3 |
| Charpy Impact, fppi | 16.2 | N.B. | N.B. | N.B. | N.B. | N.B. | N.B. | N.B. |
| Rockwell Hardness, M | 22 | 33 | 41 | 49 | 48 | 27 | 32 | 96 |
| DTL °C. (annealed) @ 264 psi | 91 | 97 | 102 | 124 | 132 | 127 | 127 | 99 |
| Vicat °C. | 108 | 124 | 136 | 145 | 147 | 140 | 143 | 110 |
| Y.I. | −6.5 | −1.3 | −2.2 | −1.5 | — | 8.9 | 21.5 | −1.4 |
| Gloss | 62 | 78 | 80 | 89 | | 85 | 84 | 87 |
| | (@ 60°) | (@ 20°) | (@ 20°) | (@ 20°) | | (@ 60°) | (@ 60°) | (@ 60°) |
| M.F.I. @ 230° C./3.8 Kg | 5.0 | 3.7–3.8 | 4.0 | 2.7–2.4 | 1.7 | 5.3 | 3.8 | 2.4 |
| Spiral Flow, *in. | 25.1 | 22.6 | 21.5–22.3 | 15.5 | NO FLOW | 16 | 12.5 | 22.5 |

*Feed: 400° F., Zone 1: 450° F., Nozzle: 500° F.
Inj. Pressure: 1000 psi; Back Pressure: 100 psi

EXAMPLES 25-27

Addition of grafted rubber (i.e., polybutadiene grafted with MMA and styrene) to the Cyrolite ® G-20 ® HF PC alloy can significantly improve cold impact properties. This is shown in Table V. By adding a relatively small amount of grafted rubber, one can improve the cold temperature impact several fold without significant effect on the heat deflection temperature.

TABLE V

EFFECT OF RUBBER LEVEL ON KEY PROPERTIES

| | | EXAMPLE | | |
|---|---|---|---|---|
| | | 25 | 26 | 27 |
| RDG Composition | PC 302 ®: | 65 | 65 | 65 |
| | G20HF ®: | 35 | 26.6 | 21.7 |
| | Additional Rubber Graft: | 0 | 8.4 | 13.3 |
| Property | % Rubber: | 5 | 10 | 13 |
| ½" Notched Izod (Room Temperature) | | 32.4 | 30.4 | 17.6 |
| ½" Notched Izod (−40° C.) | | 2.5 | 14.4 | 14.9 |
| DTL @ 264 psi, °C. (Annealed) | | 125 | 124 | 128 |

The above described commercial rubber modified acrylic multipolymer alloys and polycarbonates used in this invention may have added, thereto, heat and light stabilizers, antioxidants, lubricants, plasticizers, pigments, fillers, glass fibers, flame retardants, dyes, and among those made apparent from the preceding description are efficiently attained, and since certain changes may be made in carrying out the above methods, and in the above compositions and products, without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in the claims, ingredients, or compounds recited in the singular are intended to include compatible mixtures of such ingredients wherever the sense permits. The adjective "about" before a range is intended to apply to both the upper and the lower limits.

Having described our invention, what we claim as new and desire to secure by Letters Patent is:

1. A polymer alloy of a rubber modified acrylic multipolymer and a polycarbonate in a weight ratio of from about 20:80 to about 80:20, wherein the rubber modified acrylic multipolymer comprises:
  A. a graft rubber grafted with graft monomers comprising methyl methacrylate and styrene, the weight ratio of rubber to graft monomers ranging from about 1:2 to about 6:1; and B. an acrylic multipolymer terpolymer of at least about 60 parts by weight of methylmethacrylate, styrene, and ethylacrylate in an amount up to about 15 parts by weight, the weight ratio of the graft rubber and the terpolymer ranging from 5:95 to 25:75, the rubber modified acrylic multipolymer being substantially free of α-methylstyrene, acrylonitrile, methacrylonitile, maleic anhydride and N-substituted maleimide.

2. The polymer alloy of claim 1, wherein the graft rubber is grafted with graft monomers consisting essentially of at least about 60 parts by weight of methyl methacrylate, styrene, and up to about 15 parts by weight of methylacrylate or ethylacrylate.

3. The polymer alloy of claim 2, wherein the graft rubber is grafted with graft monomers consisting essentially of from about 60 to about 85 parts by weight of methyl methacrylate, from about 15 to about 30 parts by weight of styrene and up to about 15 parts by weight of methylacrylate or ethylacrylate.

4. The polymer alloy of claim 1, wherein the acrylic multipolymer is a terpolymer of from about 60 to about 80 parts by weight of methylmethacrylate, from about 15 to about 30 parts by weight of styrene and ethylacrylate in an amount up to about 15 parts by weight.

5. The polymer alloy of claim 4, wherein the acrylic multipolymer is a terpolymer of from about 70 to about 80 parts by weight of methylmethacrylate, from about 15 to about 25 parts by weight of styrene and about 5 parts by weight of ethylacrylate.

6. The polymer alloy of claim 1, wherein the graft rubber is polybutadiene grafted with the graft monomers.

7. The polymer alloy of claim 1, wherein the rubber modified acrylic multipolymer comprises about 14 percent by weight rubber.

8. A polymer alloy of a rubber modified acrylic multipolymer and a polycarbonate in a weight ratio of from about 20:80 to about 80:20, wherein the rubber modified acrylic multipolymer comprises:
A. a graft rubber grafted with graft monomers consisting essentially of from about 60 to about 85 parts by weight of methyl methacrylate, from about 15 to about 30 parts by weight of styrene and up to about 15 parts by weight of methylacrylate or ethylacrylate, the weight ratio of rubber to graft monomers ranging from about 1:2 to about 6:1, and
B. an acrylic multipolymer terpolymer of from about 60 to about 80 parts by weight of methylmethacrylate, from about 15 to about 30 parts by weight of styrene and ethylacrylate in an amount up to about 15 parts by weight, the weight ratio of the graft rubber and the acrylic multipolymer ranging from 5:95 to 25:75.

9. The polymer alloy of claim 8, wherein the graft rubber is polybutadiene grafted with the graft monomers.

10. The polymer alloy of claim 8, wherein the rubber modified acrylic multipolymer comprises about 14 percent by weight rubber.

11. The polymer alloy of claim 8, wherein the acrylic multipolymer is a terpolymer of from about 70 to about 80 parts by weight of methylmethacrylate, from about 15 to about 25 parts by weight of styrene and about 5 parts by weight of ethylacrylate.

* * * * *